May 12, 1931. J. W. LEE 1,804,795
BEVERAGE MAKING MACHINE
Filed April 1, 1929 2 Sheets-Sheet 1
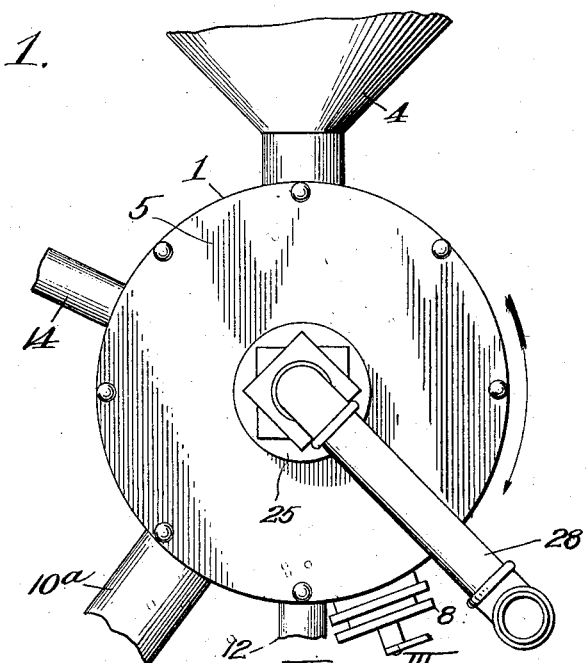
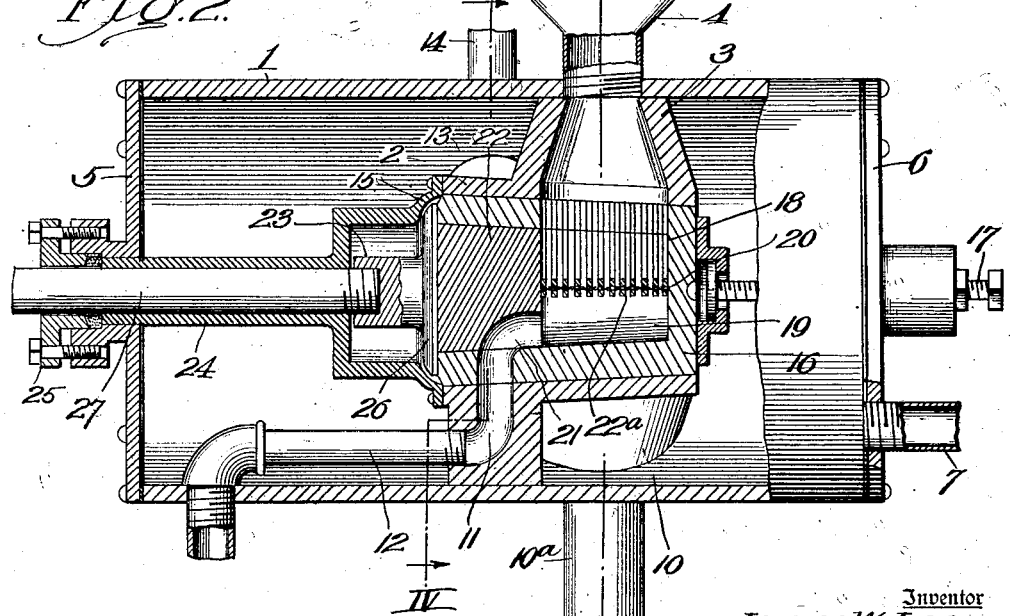
Inventor
James W. Lee, May 12, 1931.   J. W. LEE   1,804,795
BEVERAGE MAKING MACHINE
Filed April 1, 1929   2 Sheets-Sheet 2

Inventor,
James W. Lee,
By Thorpe & Thorpe
Attorneys.

Patented May 12, 1931

1,804,795

UNITED STATES PATENT OFFICE

JAMES W. LEE, OF KANSAS CITY, MISSOURI

BEVERAGE MAKING MACHINE

Application filed April 1, 1929. Serial No. 351,552.

This invention relates to appliances for making beverages, of that class produced by an application of water at or near the boiling point to a portion of ground or pulverized coffee, chocolate, tea or other material. As distinguished from present methods where the beverage is made in quantity and drawn off cup by cup, at more or less irregular intervals, my object is to produce an appliance for making one portion of beverage for each order in about as quick succession, if necessary, as coffee can be drawn from an ordinary urn, the portions being made from equal quantities of fresh stock and water at fixed temperature so as to be of uniform quality, regardless of the lapse of time between orders.

A further object is to provide an appliance characterized as set forth, with means for effecting the discharge of the used or exhausted stock or dregs of coffee, tea or the like, in the interval between the successive productions of the portions of the beverage.

More specifically my object is to take water at house service pipe pressure, heated to the desired degree, and pass a measured volume thereof through a measured quantity of ground or pulverized coffee or the like, or a measured quantity of tea stock, for transformation into the respective beverage; then effect the discharge of such beverage into a receptacle; and then utilize water, in reversed flow—as regards the stock containing chamber—to wash from said chamber, the dregs, in the shape of coffee grounds, tea leaves or chocolate residuum, the cycle of operations of making and discharging the beverage and expelling the dregs being accomplished in as rapid order as service demands.

A further object is to provide an appliance of the type depicted, which, for heavy service periods, such as develop at banquets, may be entirely automatic in operation, or may be controlled manually when used for supplying occasional or irregularly spaced orders as encountered in the ordinary restaurant.

With the general objects in view above set forth, the invention consists in certain novel and useful features of construction and combination of parts as hereinafter described and claimed; and in order that it may be fully understood, reference is to be had to the accompanying drawings, in which:

Figure 1 represents an end view of a beverage making machine embodying the invention.

Figure 2 is a central vertical longitudinal section of the same.

Figure 3:
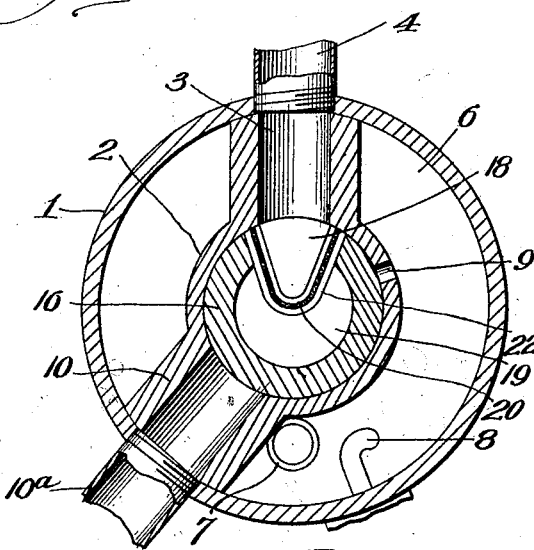
Figure 3 is a section on the line III—III of Figure 2.
Figure 5:
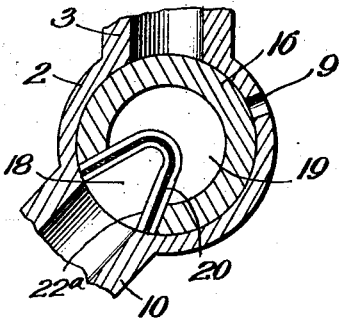
Figure 5 is a fragmentary section corresponding to Figure 3, but illustrating the beverage chamber in discharge position.
Figure 4:
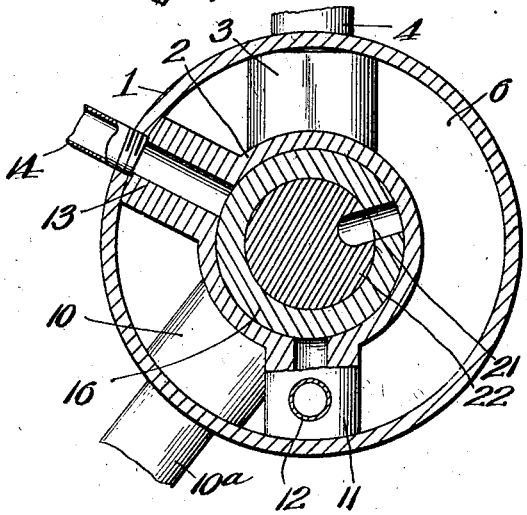
Figure 4 is a section on the line IV—IV of Figure 2 but with the valve plug in a different position of rotatable adjustment.
Figure 6:
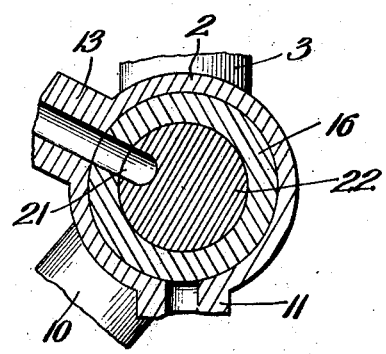
Figure 6 is a section similar to Figure 4, but with the parts in the position indicated in Figure 5.

Referring to the drawings in detail, 1 indicates a cylinder containing a valve casing 2 suitably supported and preferably spaced from and disposed concentrically within the cylinder.

An intake passage 3 leads to the interior of the valve casing from a supply hopper 4, for coffee, tea or any other substance from which a beverage may be produced through the flow of water at or near boiling temperature. It is contemplated that the substance may be deposited in the hopper each time a portion of beverage is to be produced or that the hopper may be of large capacity, in some instances large enough to make several hundred portions or cups of coffee, for example, and it is also contemplated for a large capacity machine, that the hopper may be provided with a constantly or intermittently driven agitator so that the substance shall not clog or pack and hence interfere with its free flow through the passage. As agitators or stirrers for various commodities are in common use, it has not been considered necessary to illustrate same. Any device which will keep a stock of dry material from packing in the hopper so as to be free to flow or be fed downward, will accomplish the purpose desired. If the commodity is a liquid no such device will be needed.

The opposite ends of the cylinder 1 are closed by caps 5 and 6, and communicating with the interior of the cylinder through the cap 6, is a water supply pipe 7, which preferably is connected to a water service line and provides water under a relatively heavy pressure. The cylinder 1 thus stands filled with water and heat is applied to preferably maintain said water at slightly below the boiling point, one convenient means of heating being illustrated in the drawing as comprising one or more electric heating elements 8 of conventional type, it being also understood that the device may be supplied with any common type of thermostat control (not shown), to control the temperature of the water in cylinder 1, and with gage glasses or other devices common in the art, to indicate the presence of water in the cylinder.

The casing 2 in the same circumferential plane as the passage 3, is formed with a hot water supply port 9 communicating with the cylinder 1, and with a waste or outlet port 10, with which a waste pipe 10a communicates. The casing 2, in a different circumferential plane than the ports above described, is provided with a beverage discharge passage 11, with which communicates a pipe 12 leading exteriorly of the cylinder 1, and with another port 13 with which a water supply pipe 14 communicates, through which water may flow into the valve for clean-out purposes, as hereinafter appears.

Within the valve casing, which is preferably of conical form and closed at its large end by a cap 15, is a hollow conical valve 16 fitting the casing with a liquid-tight joint and rotatable therein. The valve is engaged at its small end by a set screw 17, adjustable in the proximate cap 6 of the cylinder 1, so that wear of the valve or casing may be readily taken up to maintain water-tight relationship. The valve 16 is formed with a pair of chambers 18 and 19 separated by a screen 20, the chamber 18 being of capacity for containing sufficient ground coffee, for example, to make a single portion (or cup) of coffee. The chamber 19 is of sufficient capacity to hold a single portion or cup of the coffee beverage or the like, and leading from the last-named chamber is a passage 21 for communication once in each revolution of the valve with the beverage discharge port 11 and, at a later period, with the reverse flow water supply passage 13, said passage 21 being formed in a plug 22 securely closing the large end of the valve 16 and retaining screen 20 in position. The removal of the plug permits of removal of the screen for cleaning, repair or replacement purposes, it being noted that the screen is mounted in a skeleton cage 22a to protect it from injury under pressure imposed upon it in the operation of the machine.

The cap 5 at the large end of the casing 2 has a stem 24, said stem being tubular and having its outer end secured in a packing gland 25 carried by the cap 5 of cylinder 1. The conical valve 16 is provided with a cap 26 closing its large end and retaining the plug 22 in position, and connected to a boss 23 of said cap is a valve operating stem or rod 27 extending through and journaled in the sleeve 24, the outer end of said rod being provided with a crank 28 for manual operation, or, if desired, in a large capacity constantly-operated machine, said operating rod 27 may be slowly driven by any suitable power mechanism, not shown.

To make a portion of coffee, assuming that the chamber 18 is filled with ground or pulverized coffee, the operator rotates the shaft in the direction indicated by the arrow, Figure 1. By the time communication between chamber 18 and passage 3 is cut off, said chamber comes into communication with the water passage or port 9 and water under pressure at or near boiling temperature, is forced into chamber 18 and through the coffee and screen until chamber 19 is filled. As this result is attained, and it is accomplished almost instantaneously, one portion of coffee beverage is made, and immediately thereafter the opening 21 comes into communication with the beverage passage 11, and the beverage flows off through the pipe 12 into a cup or other suitable receptacle. Immediately after this occurs, the chamber 18, in inverted position, comes into communication with the exhaust passage 10, and at about the same time passage 21 comes into communication with the reverse water flow port or passage 13, so that water under pressure may pass in the reverse direction through the screen 20 and force the mass of grounds or dregs from chamber 18 through passage 10 into waste pipe 10a, the water circulating in this reversed direction to thoroughly wash the screen of all ground coffee or sediment. As the exhaust or clean-out chamber 18 is larger than the passage 21, it will be evident that all clean-out water will drain from the valve chambers after the clean-out water has been shut off through rotation of the valve. Continued rotation of the valve then breaks communication between chamber 18 and exhaust passage 10 and immediately thereafter chamber 18 again attains its original position in communication with passage 3, and is immediately recharged or refilled with ground or pulverized coffee. If no more than a single portion or cup of coffee is desired, the rotation of the valve is arrested. In the event a second cup is immediately desired, the operation of the valve is immediately repeated, and it will be readily seen that if a very large number of portions or cups of coffee are desired in rapid succession, it may be desirable to effect automatic rotation of the valve.

It will be apparent that because the quantities of coffee supplied are always equal and the water supply for making the coffee is maintained at a fixed temperature, each portion of coffee made will be of the same strength and temperature and therefore quality regardless of whether the operation of the valve is fast or slow, and regardless of whether there is any interval of time elapsing between rotations of the valve, it being apparent of course that by maintaining the water in the cylinder at a predetermined temperature regardless of whether coffee is being made or not, there can be no cooling off of the parts of the machine to effect or vary the temperature of the beverage.

In the foregoing specification I have set forth in considerable detail an apparatus and mode of operation which I have found suitable for carrying out the prime object of the invention, namely, an apparatus which will effectually clean the hopper and protect against scale incrustation. It is to be understood, however, that the details are illustrative only and for the purpose of making the invention clear, and that I do not regard my invention as limited in any sense to the details illustrated, except in so far as such limitations are included within the terms of the appended claims in which it is my intention to claim all novelty inherent in my invention as broadly as is possible in view of the prior art.

I claim:

1. A beverage machine comprising a casing provided with a stock-charging port, two liquid-charging ports, a beverage-discharging port and a waste port, and a movable receptacle in said casing having communicating stock-receiving and beverage-holding chambers; the stock-receiving chamber being adapted for successive registration with the stock-charging port and one of the liquid-charging ports and the waste port, and the other chamber for successive registration with the beverage-discharging port and the other liquid-charging port of the casing; the registration of the beverage chamber with the last-named port occurring during registration of the stock-receiving chamber with the waste port.

2. A beverage machine, comprising a casing provided with a stock-charging port, two liquid-intake ports, a beverage-discharging port and a waste port, and a movable receptacle in the casing, having a stock-receiving chamber for successive communication with the stock-charging port, one of the liquid-intake ports and the waste port, and having a beverage-holding chamber and a connecting beverage discharge passage for communication with the beverage discharging port of the casing in the interim between the communication of the stock-receiving chamber with one of the liquid-intake ports and the waste port of the casing, and also for communication with the other liquid-intake ports of the casing as the stock-receiving chamber communicates with the waste port.

3. A beverage machine, comprising a casing provided with a stock-charging port, two liquid-intake ports a beverage-discharging port and a waste port, and a movable receptacle in the casing havng a screen partitioning the receptacle into stock-receiving and beverage chambers, the stock receiving chamber successively communicating with the stock-charging port, one of the liquid-intake ports and the waste port, the receptacle also having a beverage-discharging passage connected with the beverage chamber and for communication with the liquid-discharging port of the casing in the interim between the communication of the stock-receiving ports with one of the liquid-intake ports and the waste port of the casing, and also for communication with the other liquid-intake port of the casing as the stock-charging port communicates with the waste port.

4. A beverage machine, comprising a cylinder having an intake port for liquid under pressure, a casing within the cylinder and provided with a stock-charging port leading exteriorly of the cylinder, two liquid-intake ports in communication with the interior of the cylinder, and a beverage discharging port and a waste port leading exteriorly of the cylinder, and a movable receptacle in the casing, having a stock-receiving chamber for successive communication with the stock-charging port, one of the liquid-intake ports and the waste port, and a beverage chamber having a beverage-discharging passage for communication with the beverage-discharging port of the casing in the interim between the communication of the stock-receiving chamber with one of the liquid-intake ports and the waste port of the casing, and for communication with the other liquid-intake port of the casing as the stock-receiving chamber communicates with the waste port.

5. A beverage machine, comprising a cylinder having an intake port for liquid under pressure, a casing within the cylinder and provided with a stock-charging port leading exteriorly of the cylinder, two liquid-intake ports in communication with the interior of the cylinder, and a beverage-discharging port and a waste port leading exteriorly of the cylinder, a movable receptacle in the casing, having a stock-receiving chamber for successive communication with the stock-charging port, one of the liquid-intake ports and the waste port, a beverage chamber communicating with the stock-receiving chamber, and a beverage-discharging port for communication with the beverage-discharging port of the casing in the interim between the communication of the stock-receiving port with one of the beverage-intake ports and the waste port of the casing, also for communication with the other liquid-intake port of the casing as the stock-charging port communicates with the waste port, and means extending from the said receptacle exteriorily of the cylinder for effecting movement of said receptacle.

6. A beverage machine, comprising a cylinder having an intake port for liquid under pressure, a casing within the cylinder and provided with a stock-charging port leading exteriorily of the cylinder, two liquid-intake ports in communication with the interior of the cylinder, and a beverage-discharging port and a waste port leading exteriorily of the cylinder, a movable receptacle in the casing, having a port for successive communication with the stock-charging port, one of the liquid-intake ports and the waste port, and having a beverage-discharging port for communication with the beverage-discharging port of the casing in the interim between the communication of the stock-receiving port with one of the liquid-intake ports and the waste port of the casing, and also for communication with the other liquid-intake port of the casing as the stock-charging port comunicates with the waste port, and means for heating the liquid in the cylinder.

7. A beverage machine, comprising a cylinder having an intake port for liquid under pressure, a casing within the cylinder and provided with a stock-charging port leading exteriorily of the cylinder, two liquid-intake ports in communication with the interior of the cylinder, and a beverage-discharging port and a waste port leading exteriorily of the cylinder, a movable receptacle in the casing, having a chamber for successive communication with the stock-charging port, one of the liquid-intake ports and the waste port of the casing in the interim between the communication of the stock-receiving chamber with one of the liquid-intake ports and the waste port of the casing, and having a beverage chamber connected to the stock-receiving chamber and provided with a beverage discharge passage for communication, with the other liquid-intake port of the casing as the stock-charging port communicates with the waste port, means for heating the liquid in the cylinder, and means extending exteriorily of the cylinder from the receptacle for effecting movement of the latter.

In testimony whereoef I affix my signature.

JAMES W. LEE.